(12) United States Patent
Höhler et al.

(10) Patent No.: US 12,043,493 B2
(45) Date of Patent: Jul. 23, 2024

(54) SORTING DEVICE (71) Applicant: Wipotec GmbH, Kaiserslautern (DE)

(72) Inventors: Hans-Sebastian Höhler, Hildesheim (DE); Ernst Moritz Müller, Hannover (DE)

(73) Assignee: Wipotec GmbH, Kaiserslautern (DE)

( * ) Notice: Subject to any disclaimer, the term of this patent is extended or adjusted under 35 U.S.C. 154(b) by 0 days.

(21) Appl. No.: 17/902,447

(22) Filed: Sep. 2, 2022

(65) Prior Publication Data
US 2023/0115441 A1     Apr. 13, 2023

(30) Foreign Application Priority Data

Sep. 6, 2021 (DE) .......................... 102021123023.3

(51) Int. Cl.
*B65G 23/04* (2006.01)
*B65G 47/82* (2006.01)

(52) U.S. Cl.
CPC ............. *B65G 23/04* (2013.01); *B65G 47/82* (2013.01)

(58) Field of Classification Search
CPC ....... B65G 23/04; B65G 47/82; B65G 47/766
USPC .............. 198/370.07–370.08, 457.06–457.07
See application file for complete search history.

(56) References Cited

U.S. PATENT DOCUMENTS

| | | | | |
|---|---|---|---|---|
| 4,498,576 A | * | 2/1985 | Anderson | B65G 47/71 198/441 |
| 4,699,275 A | * | 10/1987 | Holsonbake | B07B 13/05 209/663 |
| 5,018,336 A | * | 5/1991 | Mengotti | B65H 75/50 53/251 |
| 5,018,619 A | * | 5/1991 | Wilson | B07B 13/05 209/707 |
| 5,052,542 A | | 10/1991 | Wipf | |
| 6,098,978 A | * | 8/2000 | Bielefeld | B65H 5/025 198/457.06 |
| 2009/0078617 A1 | * | 3/2009 | Large | B65G 47/766 209/523 |
| 2017/0334656 A1 | | 11/2017 | Saastamo | |
| 2018/0057277 A1 | | 3/2018 | Zimmer | |

FOREIGN PATENT DOCUMENTS

| | | |
|---|---|---|
| CH | 715814 A1 | 8/2020 |
| DE | 36 04 561 A1 | 8/1987 |
| EP | 3650380 A1 | 5/2020 |
| FR | 1531607 A | 7/1968 |

OTHER PUBLICATIONS

German patent office action issued May 6, 2022 in application No. 102021123023.3.

* cited by examiner

*Primary Examiner* — Mark A Deuble
(74) *Attorney, Agent, or Firm* — The Culbertson Group, P.C.

(57) ABSTRACT

A sorting device for sorting out discrete products from a product stream includes a friction element driven by a roller. The friction element is movable to press against a product to be sorted out and thereby apply a frictional force to the product to sort the product out of the product stream.

21 Claims, 4 Drawing Sheets

SORTING DEVICE

TECHNICAL FIELD OF THE INVENTION

The present invention relates to a sorting device and an associated method for sorting discrete products from a product stream.

BACKGROUND OF THE INVENTION

Sorting devices for sorting discrete products from a product stream are known in various designs. Various steering means (e.g. pushers, diverters, flaps or blow nozzles) are actuated along the conveyor path in order to apply a deflection force to individual products and move them out of the conveyor path to accomplish the desired sorting.

Products that are conveyed quickly and at a small distance from each other cause difficulties, as the steering means for a forward and backward movement are often not sufficiently fast and precise enough to reach one of the series of closely spaced and quickly conveyed products in order to sort that one product out. This is especially true when narrow products (whose length is significantly greater than their width) are transported with their longitudinal directions transverse to the conveying direction and closely spaced on a conveyor belt. This includes bar-shaped products (chocolate bars or similar), for example. Flat bags (which can also be referred to as sticks, tubular bags, spice bags, etc.) are also difficult to sort out with blow nozzles, for example, as they offer only a small target surface for a compressed air jet at the sides. The use of a pusher is also unsuitable here, as the large stroke required for reliable sorting cannot be achieved with short product spacing due to the large product length relative to the product width.

SUMMARY OF THE INVENTION

An object of the invention is to provide a sorting device particularly adapted for sorting discrete, narrow, or flat products conveyed at a high conveying rate or at high speed, which overcomes the aforementioned disadvantages.

One aspect of the invention encompasses a sorting device that sorts products by applying a frictional force. A sorting device according to this aspect of the invention includes a friction element that may be brought into contact with the product to be sorted (or pressed against the product) to generate a frictional force acting on the product. The direction of the frictional force is selected in such a way that the product moves sideways out of the product flow in accordance with the frictional force, for example to fall into a container or to be directed onto another conveyor path.

A sorting device according to this first aspect of the invention comprises a conveyor with which discrete products resting (that is, supported) thereon can be conveyed along a conveying path in a conveying direction X. The conveyor may, for example, comprise a driven conveyor belt on which a plurality of products lie one behind the other in close proximity for conveyance in the X direction. Alternatively, the conveyor can also be a slide surface formed by a chute or a slide plate or a plate chain. In any case the conveyor is configured to allow products supported on the conveyor surface to be displaced along that surface. The products may also be arranged as individual groups, wherein a group includes a plurality of closely spaced products, and wherein the group is spaced from a following or preceding group by a distance that is greater than, less than or equal to the spacing of the products within the group.

A sorting device in accordance with this first aspect of the invention further includes a first roller that can be driven about an axis at high speed. The first roller either serves as a friction element itself, or it drives a friction element in the form of a belt, which partially or completely rotates around the first roller. The first roller, and with it the friction element, may be driven to rotate, preferably at high speed (500-3000 rpm).

The friction element is movable along a lifting direction between a raised position and a lowered position. In particular, the friction element can be lowered towards the conveyor or raised away from it in a lifting direction Z in order to selectively apply a contact pressure to a product conveyed along the conveyor. When lowered to a lowered position for a given product, the friction element contacts the product on its upper side along a contact zone and thereby generates a frictional force acting between the friction element and the product. The first roller or its friction element is aligned in such a way that the product, as a result of the frictional force, is accelerated in a first sorting direction deviating from the conveying direction X and is sorted out of the product flow by being ejected sideways. Alternatively, when the friction element is raised away from the conveyor to a raised position for the given product, the product may pass under the friction element in the conveying direction and thus remain in the product steam.

The term "roller" here also includes, for example, a wheel-shaped element which has a hub and spokes extending therefrom, which extend to an outer circumferential body forming the wheel circumference. According to some embodiments, the spokes can also run in a curved manner in order to form a flexibility or low stiffness in the radial direction, so that the rotating body can be moved relative to the hub and thereby allows the roller to be softly pressed against a product. Another rotationally symmetrical body that can receive or is integrally formed with a gripping structure on its outer circumference can also fall under the term "roller," for example a gear wheel.

The friction element can be formed integrally with the first roller or be attached to it as a friction lining or belt. For example, the first roller could be formed from a soft, grippy material. Due to its soft qualities, the friction element can be easily pressed onto the product, flexibly conforming to its surface to provide the most grippy contact possible to generate and transmit the frictional force. The material of the friction element can be, for example, foam material, rubber, sponge rubber or another material known by the skilled person to have the highest possible coefficient of friction. The friction element can also be provided with regular elevations or depressions (lamellae, knobs, etc.) or another profile in order to be able to at least partially form a positive connection with the product to be sorted in addition to the frictional connection. For example, a toothed belt or a PU V-belt can be used for this purpose. The soft qualities and/or deformability of the friction element and/or its profile also reduces the risk of human limbs being drawn in or trapped between the friction element and the product. A soft friction element that is compressible in the radial direction may also be used to sort irregularly shaped products, as the friction element can conform to the contour of the product on contact.

The deformability of the friction element also allows greater tolerances in the parameterization of the device. Slight deviations in the product height or the lowering depth of the friction element are compensated for by the flexibility of the friction element, which then presses itself more or less strongly against the product.

Instead of forming the first roller simultaneously or in one piece as a friction element, some embodiments may equip the first roller with a friction element of the aforementioned type only on the outer circumference of the first roller. For example, an annular friction element or a friction element belt could be placed around the roller with suitable pretensioning. In these embodiments the friction element is easily replaceable, while the roller can be formed of a stiffer material to which a driving force for rotation generation can be more easily transmitted. Such a roller body could, for example, also be produced using 3D printing and also have, as an integral part, a roller axle and/or a toothed wheel or toothed profile via which the first roller can be driven by an adjacent motor by means of a toothed belt or chain for rotation. A roller that is integrally formed with or as a friction element can also be manufactured with 3D printing.

In some embodiments the friction element can be designed in the form of an elongated belt which is guided around the driven first roller and a second roller spaced therefrom, thereby forming an elongated straight belt section. In this case, the product to be sorted out could also be impacted by the straight section. This increases the contact zone, which facilitates the generation and transmission of the frictional force required for sorting. In this case, it may be sufficient to lower only one of the two rollers towards the product if, in the lowered position, the straight belt section rests on the product surface essentially parallel to it.

Regardless of whether the friction element is formed as a belt that is guided around the first roller and at least one additional roller or formed as an element that extends around the entire circumference of the first roller, the friction element extends along a portion of the circumference of the first roller. The term "portion" is used here and in the claims to mean some or all. That is, a portion of the circumference of the first roller may be the entire circumference or less than the entire circumference of the first roller.

According to some embodiments of the invention, it is provided that the direction of rotation of the roller (and with it the direction of rotation of the friction element) can be advantageously reversed. This means that the direction of the frictional force is also reversed on contact with the product, so that the product can be sorted out of the product flow or onto the other side of the conveyor in the opposite direction. This allows products to be sorted out in two different directions, for example in opposite directions.

In some embodiments, the friction element is movable in lifting direction Z by moving the at least one roller up and down between an upper end position $Z_o$ and a lower end position $Z_u$ by means of a lifting mechanism along a straight or curved path. The lifting mechanism may be stationary with respect to the conveying direction. In the upper end position, the friction element is positioned far enough above the conveyor that the products can be conveyed undisturbed in the conveying direction underneath. In the lower end position, the lowest section of the friction element is lower than the top of the products. In order to selectively sort out a product, the friction element is lowered by means of a lifting mechanism in such a way that it contacts and acts on the upper side of the conveyed product exactly when the latter reaches the position below the friction element along its conveying path. The friction force that occurs immediately and, if necessary, only briefly, and the high speed of the roller or friction element ensure that the product is abruptly moved sideways out of the product flow. Due to the preferably strong acceleration of the product, this can also be referred to as ejection.

The roller and the friction element driven by it may be arranged orthogonally to the conveying direction, the roller axis then running parallel to the conveying direction. In this case, the first sorting direction is also transverse or orthogonal to the conveying direction and the products are discharged from the product flow at right angles. The sorting angle α between the conveying direction and the sorting direction is then 90°. However, some embodiments may have a different sorting angle in order to move individual products obliquely forwards or backwards out of the product stream. The sorting angle α is then larger or smaller than 90°.

The roller axis in some embodiments can also be inclined with respect to the conveying direction, for example slightly sloping in the conveying direction. In the case of an essentially cylindrical friction element, this creates a tapered wedge between the surface of the product and the friction element. In this way, an additional pressing force can be generated by the product to be sorted out forming the wedge with the (completely or partially) already lowered friction element during conveying in the conveying direction and thus being clamped in the direction of the conveying element. However, this clamping process is only of short duration, as the product is simultaneously moved laterally out of the product flow by the driven friction element.

The vertical distance between the upper end position $Z_o$ and the lower end position $Z_u$ may be chosen to be as small as possible and is preferably less than 20 mm, most preferably less than 10 mm. The small stroke can be passed through advantageously in a short time, so that the sorting device can be lowered very quickly onto a product to be sorted out. The position of the two end positions is preferably measurable and/or adjustable. In some embodiments each end position, in particular the lower end position, can be automatically adjustable by means of a control unit, for example according to previously recorded operating parameters or dimensions or distance between the products. For example, with a product height of 20 mm, the lower end position could be set in such a way that the friction element (without a product underneath) would lower itself to 15 mm above the conveyor belt or compress itself by 5 mm while it is pressing on a product underneath (contact pressure dimension 5 mm, see below). This adjustment can be made automatically by automatically sensing the height (or other dimensions) of each individual product or a representative product of a batch and signaling this sensed height to the control unit. In this way, products with different heights can follow one another and, if necessary, be sorted out via the automatically adjusted contact pressure dimension.

The lifting mechanism can, for example, be actuated via a piezo drive and/or via a cam disk and/or via a pneumatic and/or electromechanical drive. For example, it could be pneumatically driven via a short-stroke cylinder.

The contact pressure with which the friction element acts on the product is preferably selectable in some embodiments. A minimum contact pressure could be specified by setting a lower end position $Z_u$, in which (without a product being impacted) the lower side of the friction element would be lower than the upper side of the product by a specified contact pressure dimension Δ. When a product is impacted, the friction element must deform by the contact pressure dimension (see FIG. 2 as described below) and exerts a certain force on the product depending on the size of the contact pressure dimension Δ. Alternatively or additionally, some embodiments may lower the lifting mechanism in a force-controlled manner until a predefinable counterforce or contact pressure is reached.

The lowering and/or lifting movement can be carried out via a suitable control unit according to predefined conditions and, for example, follow a predefinable travel-time profile. Some embodiments may always lower the friction element until a predefined pressure force is reached. This allows different products to be sorted out without having to change parameters or relearn the system. The same applies to the rotation speed of the roller, for which a suitable profile can be preset. This could ensure, for example, that the roller is driven at no or low speed in the raised position but reaches a minimum speed before contacting a product. The control can also be carried out in such a way that the predefined profile is modified with the help of measured values and thus adapted to the respective individual product or batch.

Although the invention is particularly advantageous for products that are conveyed quickly, it can also be used well for products that are conveyed at low speed or even in start-stop mode in which conveying is not continuous but intermittent. These conveyance speed changes can occur regularly or irregularly, for example in the case of fluctuations in the supply or preceding weighing processes in which the product is weighed at rest. A product to be sorted out can then be impacted by the friction element while it is being transported in the direction of conveyance (preferred case) or is resting or lying on the conveyor essentially motionless.

A second aspect of the invention comprises a method that uses a previously described sorting device embodiment. Such a method comprises the following method steps:
 a) Lowering the driven friction element onto a product to be sorted out which is arranged below it on the conveying means and is preferably conveyed simultaneously in conveying direction X, so that the friction element applies a contact force to the upper side of the product facing away from the conveying means along a contact zone in order to sort the product out of the product flow by ejecting it laterally;
 b) Raise the friction element to allow a following product to pass or to also sort out in repetition of step a).

To carry out a process according to this second aspect of the invention, a suitable control unit can be provided which controls the movement of the friction element or the roller with rotating friction element in coordination with other parameters relating to the product to be sorted out. These can be the position of the product along the conveyor path, the product speed, orientation, dimensions, fragility, the nature of one or more surfaces of the product, the weight of the product, or other characteristics associated with the product, for example metallic or other undesirable components in a food product.

If the friction element is moved with a lifting mechanism, the control unit controls the mechanism accordingly. The control unit can receive information for identifying the product to be sorted out from a separate sensor unit. Alternatively, the products to be sorted out may be identified with the aid of the control unit using, for example, image recognition means, RFID or other sensor or recognition means known to the skilled person. For example, a camera could be directed at the product flow, the image signals of which are evaluated by the control unit to determine whether, for example, a chocolate bar detected by the camera is too large or too small or bears a faulty label, has been incorrectly packaged or the like. Other sensors can be used to determine whether the product is too light or too heavy or contaminated with foreign objects. In particular, a scale or even an X-ray inspection device can be used to determine at least one characteristic of the product that is decisive for the decision to reject, that is, remove from the product stream using the friction element.

A sensor unit can also be configured to determine itself when the product conveyed on the conveyor and to be sorted out will reach the sorting device if it is provided with corresponding data about the position of the product and the conveying speed. In a some embodiments, the control unit only receives a start signal emitted, for example, by a light barrier, which immediately leads to the lowering of the first roller or the friction element. Some embodiments may also move the sorting device in the conveying direction or transversely to it in order to be able to select a particularly favorable position for sorting out products arriving there. Some embodiments may carry out such a displacement automatically, for example according to previously detected measured values, which relate in particular to the position of a product to be sorted out on the conveyor.

The lowering movement as well as the subsequent lifting of the friction element may take place in a very short time, preferably within less than 100 ms, most preferably in less than 10 ms. Due to the short lowering time (and a preferably also very short lifting time), the distance between the products on the conveyor can be reduced and thus the conveying rate can be increased. After each lowering, the friction element is preferably raised again so that the following next product can be conveyed into a position along the conveying path at which that following product may be sorted out or allowed to pass. A device according to the invention may be designed to convey products at a conveyor rate of more than 500 pieces per minute and to selectively sort out individual products from this product flow. Preferably, the conveying rate is more than 1000 pieces per minute. Most preferably, a conveying rate of more than 2000 pieces per minute may be achieved.

A sorting device according to the invention functions particularly well when the coefficient of friction $\mu_{BP}$ between the upper side of the conveyor and the material of the product lying on the conveyor is selected to be smaller than the corresponding coefficient of friction $\mu_{PT}$ in the contact zone between the product and the section of the friction element acting there. The greater the difference between these coefficients, the easier it is for the product to slide along the surface of the conveyor and the lower the contact pressure required to generate sufficient frictional force between the friction element and the product to eject the product.

In some embodiments, the roller receiving or forming the friction element is driven so that the friction element reaches a rotational speed between 0.1 m/s and 100 m/s, preferably between 1 m/s and 10 m/s. The friction element may be driven at a constant speed and without interruption while individual products are conveyed underneath or sorted out with it. Alternatively, however, the speed can also be adjusted depending on other process parameters, for example in the case of large production gaps or in start-stop operation. In the case of products that follow one another closely and are to be sorted out along the conveying path, it may be undesirable or even impossible to switch off the drive between two products. However, this form of implementation is not ruled out. It is particularly suitable if only very few products have to be sorted out of a large number of products, so that the friction element only has to be used infrequently. In this case, switching off the drive in the meantime (that is, between products that need to be ejected) can be useful, at least from an energy point of view.

For rapid sorting, it is helpful if the contact time during which the friction element touches the product is as short as possible and yet sufficient to introduce the necessary friction force into the product to move it safely out of the conveying path. Preferably the contact time is less than 100 ms, more preferably less than 20 ms, most preferably less than 10 ms.

Some embodiments of a sorting device according to the invention provide that several first rollers of the same type or friction elements carried by them lie closely behind one another in the conveying direction and can be lowered or raised independently of one another. This results in several advantages.

For example, to sort out a product, two or more of the friction elements can be lowered at the same time in order to jointly introduce a stronger friction force onto the product. This is particularly possible if the product is wider in the direction of conveyance than a single friction element and can instead be acted upon simultaneously by two or more friction elements, for example.

Also, for sorting out successive products, different friction elements can be controlled alternately in order to further increase the conveying rate. For example, a first product could be sorted out with a first friction element. If a second product to be sorted out follows immediately afterwards and is already within the effective range of another friction element, this other friction element can be lowered to sort out the second product, while the first friction element is raised again after the first product has been sorted out. The individual ejections then overlap in time, which enables a higher conveying rate.

In an embodiment with several friction elements arranged one behind the other and which can be lowered separately, each friction element can be designed in the form of an elongated belt which is guided around a first and a second roller, as already explained above. All first or second rollers could lie on a common, essentially stationary and preferably driven axis, while the other roller of each pair could be lowered or raised individually.

In some embodiments a device according to the invention provides for the friction element to be lowered from above onto a product located underneath, which in turn rests on the surface of the conveyor. Other embodiments could apply the friction element to the product from the side or from below. In these cases, it would only have to be ensured that a stop surface opposite the friction element is provided for the product in order to be able to build up the necessary counterpressure for generating the frictional force. For example, the products could be conveyed along such a vertical stop surface (resting on a conveyor belt running orthogonally thereto), and a friction element opposite the stop surface generates a frictional force acting parallel to the stop surface, for example orthogonally to the conveyor belt upwards. In this case, the product would be ejected upwards out of the product flow. Instead, the friction element could also act on the underside of a product conveyed via a slot, for example, which is guided on its upper side along a closely spaced stop surface in order to move the product laterally out of the product flow when the product is impacted.

These and other aspects, advantages, and features of the invention will be apparent from the following description of representative embodiments, considered along with the accompanying drawings.

DESCRIPTION OF REPRESENTATIVE EMBODIMENTS

Figure 1:
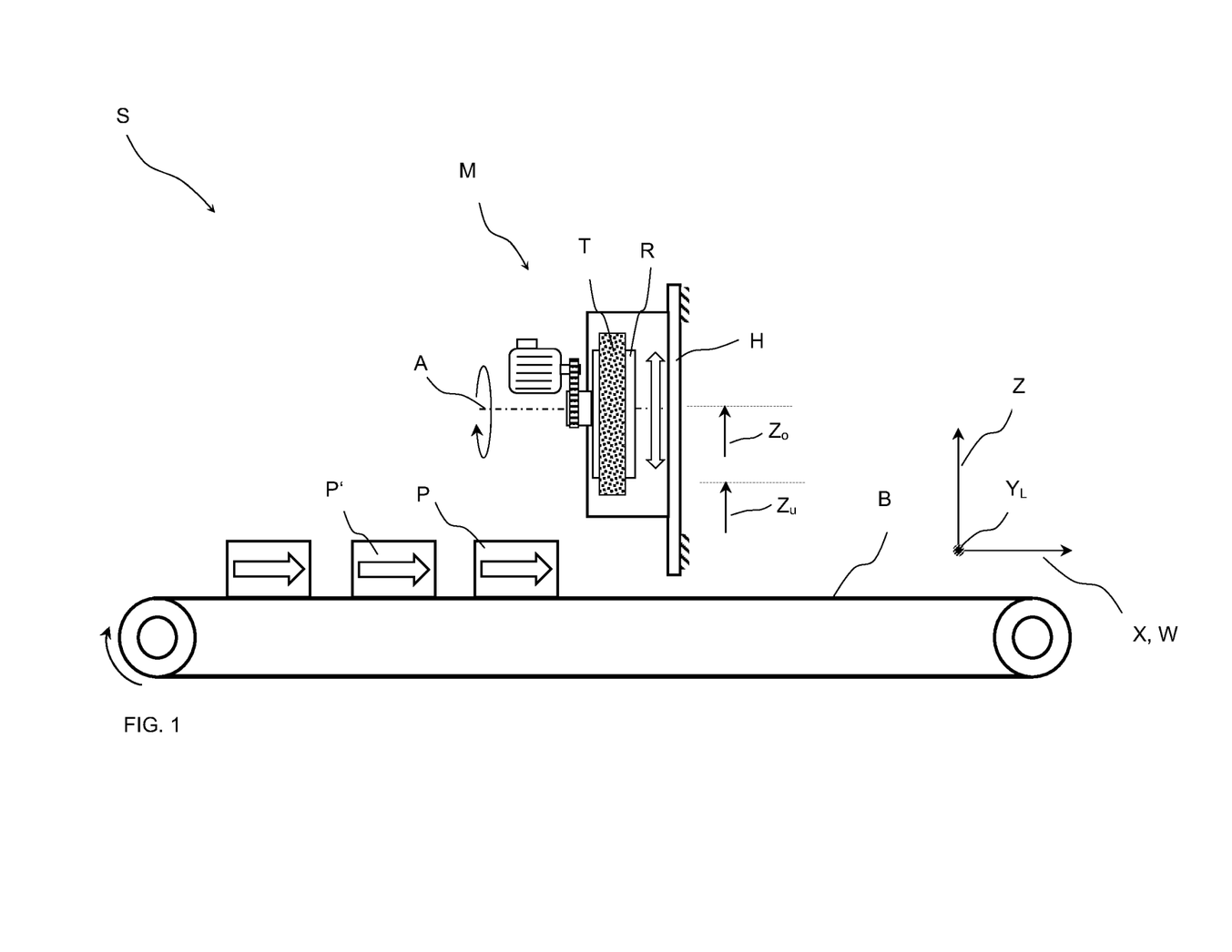
FIG. 1 is a schematic side view of a sorting device with conveyor belt.

FIG. 1 shows a simplified side view of a sorting device S according to the invention. Sorting device S comprises a conveyor in the form of a conveyor belt B guided around two rollers. Individual products P, P' lying on the conveyor belt B are conveyed in a conveying direction X and along a conveying path W, respectively. The products P, P' are relatively narrow as seen in the conveying direction X and comparatively long in a transverse direction Y orthogonal to the conveying direction X (see also the top view in FIG. 3). For example, such products can be packaged or unpackaged chocolate bars or muesli bars.

A first roller R is arranged above the conveyor belt B, the roller axis A of which extends parallel to the conveying direction X in this embodiment. An unspecified drive, for example a motor, drives the roller R to rotate via a toothed belt.

On its outer circumference, the first roller R is provided with a friction element T which is compressible in the radial direction and has a high coefficient of friction. The first roller R is movable in a lifting direction Z between an upper end position $Z_o$ and a lower end position $Z_u$ as indicated by the double arrow via a lifting mechanism H, which is only shown schematically. The lifting direction Z extends orthogonally to the conveying direction X and to the transverse direction Y. With the help of the lifting mechanism H, the first roller R with the rotating friction element T can be lowered towards or raised away from the conveyor belt B in the lifting direction Z. The motor for driving the first roller can be moved along with it or remain stationary as long as the drive of the first roller is ensured continuously (or as necessary to effect a desired product ejection).

Figure 2:
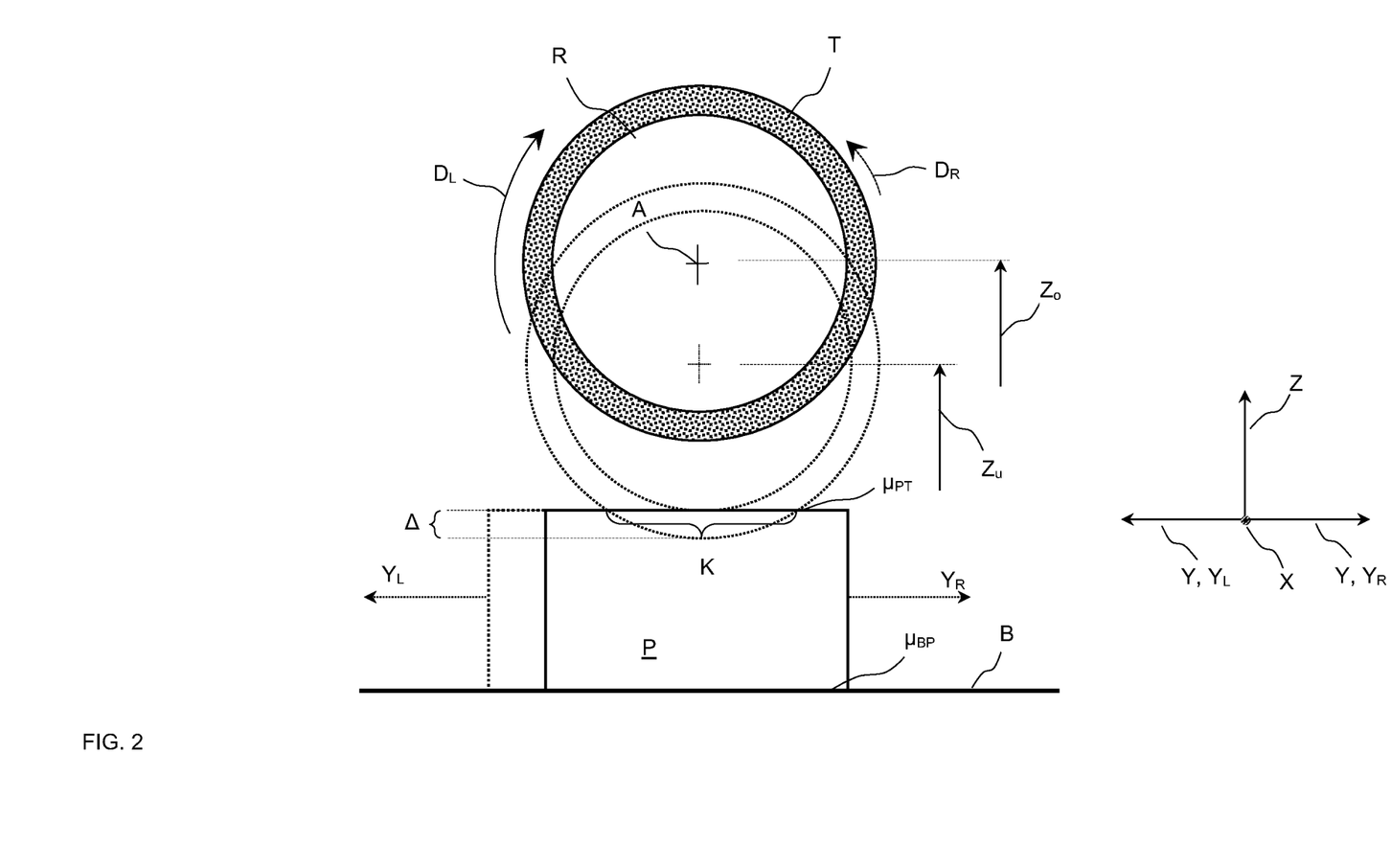
FIG. 2 is a schematic partial view looking against the conveying direction X.

FIG. 2 shows a simplified partial view of the design shown in FIG. 1, looking in the direction opposite the conveying direction X. The first roller R with the friction element T mounted on it is shown in its upper end position $Z_o$ and is driven to rotate in a first direction of rotation $D_L$. The device is also designed to change the direction of rotation if necessary and to drive the first roller R in an opposite second direction of rotation $D_R$. It is noted that in the example of FIG. 2 the friction element T extends along a portion of the first roller R comprising the entire circumference of the first roller R.

Below the first roller R, a product P to be sorted out can be seen, which is being conveyed in conveying direction X and has just reached the X-position below the first roller R. In order to sort out this product P from the product flow, the first roller R and its friction element T is moved towards the lower end position $Z_u$ by means of the lifting mechanism H. This preferably happens very quickly, within a few milliseconds. In the process, the friction element T comes into contact with the surface of the product P. Due to its elasticity in the radial direction, the friction element T can be pressed against the product by a certain amount of pressure Δ, whereby it nestles against the surface of the product P and presses on it along a contact zone K. Depending on the elasticity or compressibility of the friction element T and the force with which the lifting mechanism H presses the first roller R downwards, a frictional force is generated along the contact zone K which acts orthogonally to the roller axis A and ejects the product P from of the product flow in a first sorting direction $Y_L$ (to the left in FIG. 2) (reversing the direction of rotation of the first roller R would result in the opposite sorting direction $Y_R$).

In order to sort out the product P in the manner described above, the coefficient of friction $\mu_{PT}$ occurring between the friction element T and the product P must be greater than the coefficient of friction $\mu_{BP}$ occurring between the product P and the surface of the conveying medium B. The greater this difference, the easier it is to move and accelerate the product P with the frictional force generated by the friction element T in order to be ejected from the product flow. The contact time between the friction element and the product is preferably very short and is in the range of milliseconds. As soon as the product has been accelerated sufficiently in the sorting direction to safely leave the product stream, the lifting mechanism H can already lift the first roller R again in order to also sort out or let pass a subsequent further product P'.

Figure 3:
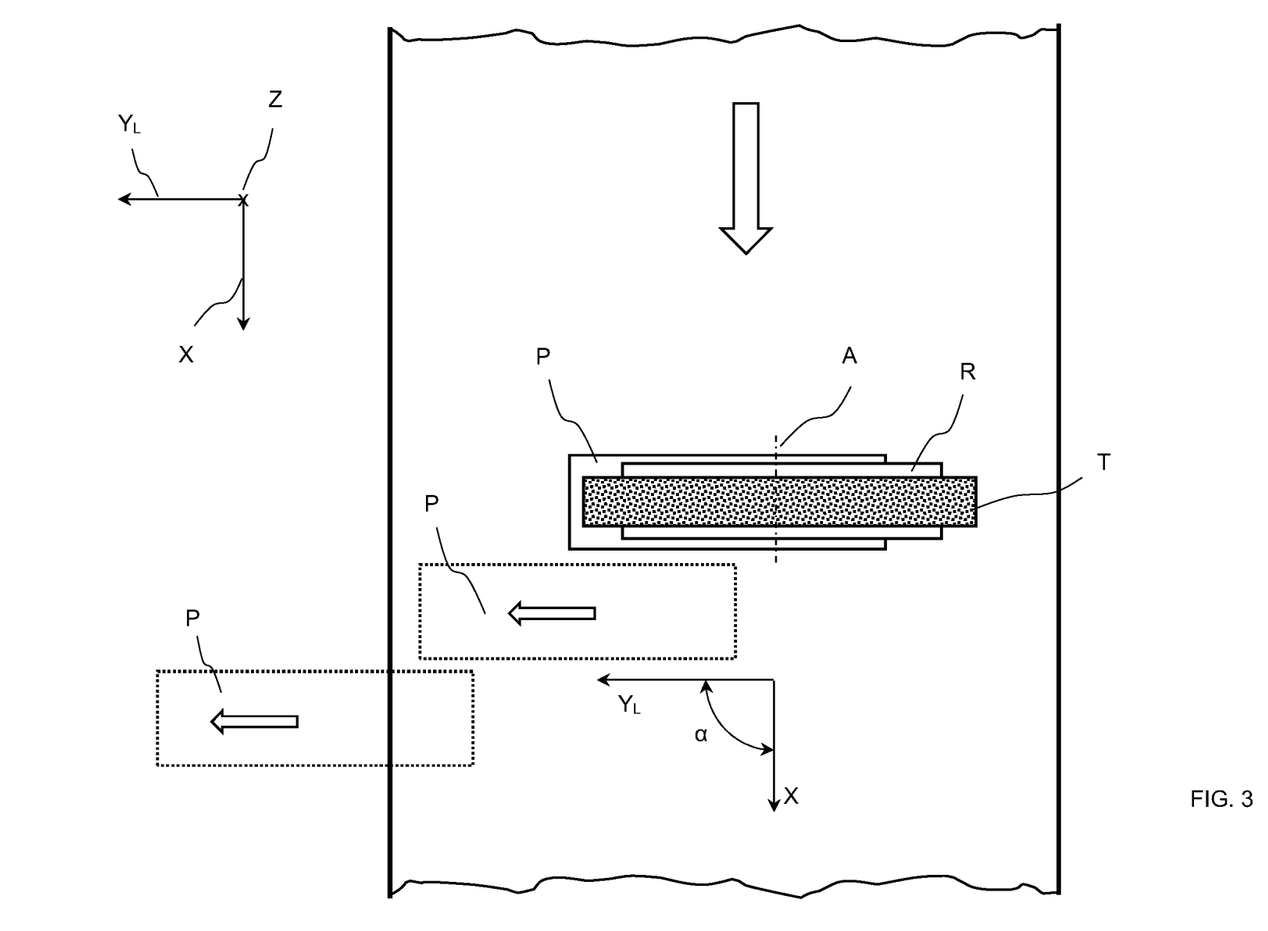
FIG. 3 is a schematic top view looking against lifting direction Z.

FIG. 3 shows a simplified top view (looking in the direction opposite Z) of how a product P to be sorted out moves in sorting direction $Y_L$ while and after being acted upon by the friction element T of the first roller R. It can also be seen that the sorting direction $Y_L$ encloses a sorting angle $\alpha=90°$ with the conveying direction X. This angle can be changed, if necessary, by the roller axis A making an angle greater than zero with the conveying direction X, since the frictional force created on the product is directed orthogonally to the roller axis A.

Figure 4:
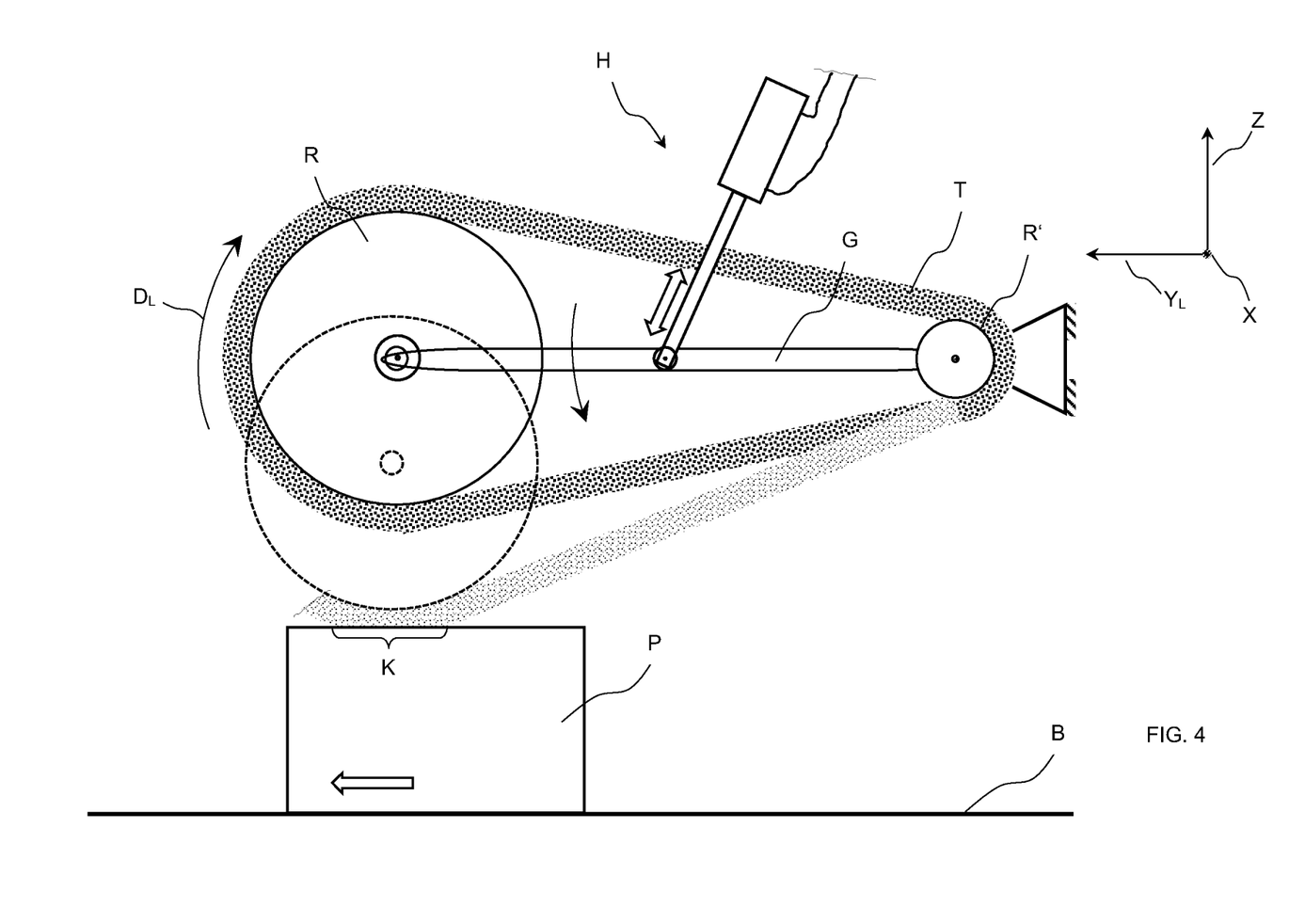
FIG. 4 is a schematic partial view of a modified embodiment, looking against the conveying direction X.

FIG. 4 shows a simplified side view of a modified embodiment of the invention similar to FIG. 2, looking in the direction opposite the conveying direction X. Here, the friction element T is in the form of a soft belt guided around the first roller R and a second roller R' so as to extend along a portion of the circumference of the first roller R comprising less than the entire circumference of the first roller R. First roller R and second roller R' are spaced apart in this example by a linkage G. While the second roller R' is arranged stationary, the first roller R can be moved up and down on a circular path section around the axis of the second roller R' by means of a lifting mechanism H engaging the linkage G and formed with a pneumatic piston. One of the two rollers R, R' is driven by a motor, not shown in more detail, so that the friction element T rotates around the two rollers in the first direction of rotation $D_L$.

The first roller R can be seen both in its upper end position, which is indicated in FIG. 4 in a solid line, and in its lowered position (shown with a dashed line). By actuating the lifting mechanism H, the friction element T comes back into contact with the product P to be sorted out when the first roller R is lowered in a known manner and applies the resulting frictional force along a contact zone K to the product P to be sorted out, possibly deforming friction element T and/or product P.

In the embodiment shown in FIG. 4, the product P is essentially impacted by the section of the friction element T on the circumference of the first roller R, which is equivalent to a more point-shaped contact. However, depending on the height of the product and the arrangement of the sorting device, a straight section of the friction element T tangential to the first roller R can also be used to act on the product in the lowered position. In this case, the contact zone K will increase, which will facilitate the generation or transmission of the frictional force. In addition, in this case, the product P is contacted along the straight section and thus in a more linear manner, whereby this line defines the sorting direction $Y_L$ more precisely and thus allows the sorting direction of the impacted product to be specified more accurately.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

In the above descriptions and the following claims, terms such as top, bottom, upper, lower, vertical, and the like with reference to a given feature are made with reference to the orientation of the structures shown in the drawings and are not intended to exclude other orientations of the structures.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

REFERENCE SYMBOLS

A Axis of the roller R
B Conveyor
$D_L$ First direction of rotation
$D_R$ Second direction of rotation
G Linkage
H Lifting mechanism
K Contact zone
P Product
P' The product following product P R First roller
R' Second roller
S Sorting device
T Friction element
W Conveying path
X Conveying direction
Y Transverse direction
$Y_L$ First sorting direction
$Y_R$ Second sorting direction
Z Lifting direction
Zo Upper end position
Zu Lower end position
α Sorting angle
$\mu_{BP}$ Coefficient of friction between conveyor and product
$\mu_{PT}$ Coefficient of friction between product and friction element
Δ Contact pressure dimension

The invention claimed is:

1. A sorting device comprising:
    (a) a conveyor for conveying discrete products in a product stream along a conveying path in a conveying direction with the discrete products being supported on a conveyor surface;
    (b) a first roller defining a first roller circumference and being configured to be driven in a first direction of rotation about a first roller axis;
    (c) a friction element extending along a portion of the first roller circumference in position to be driven about the first roller as the first roller is driven about the first roller axis, the friction element being moveable in a lifting direction extending transverse to the conveyor surface between a lowered position and a raised position;
    (d) wherein the friction element in the lowered position is located relative to the conveyor surface to contact a selected product of the discrete products with a contact pressure force along a contact zone to thereby exert a first direction frictional force on the selected product as the first roller is driven in the first direction of rotation, the first direction frictional force being sufficient to accelerate the selected product in a first sorting direction deviating from the conveying direction to sort the selected product out of the product stream; and
    (e) wherein the first roller and with it the friction element are selectively drivable about the first roller axis in a second direction of rotation opposite to the first direction of rotation at least when the friction element is in the lowered position.

2. The sorting device of claim 1 wherein the friction element comprises a friction lining formed integrally with the first roller.

3. The sorting device of claim 1 wherein the friction element comprises a structure formed separately from the first roller and mounted on the first roller so as to extend along on the entire circumference of the first roller.

4. The sorting device of claim 1 wherein the friction element comprises a belt that is guided around the first roller and a second roller and has at least one straight section in a belt longitudinal direction.

5. The sorting device of claim 1 further including a lifting mechanism connected to the first roller and operable to move the first roller in the lifting direction between an upper end position and a lower end position and wherein the lowered position of the friction element corresponds to a position of the first roller at the lower end position or between the lower end position and the upper end position.

6. The sorting device of claim 5 wherein the distance between the upper end position and the lower end position is less than 20 mm.

7. The sorting device of claim 1 wherein at least two of the conveying direction, the first sorting direction, and the lifting direction are orthogonal to each other.

8. A method of sorting discrete products from a product stream being conveyed along a conveying path in a conveying direction while being supported on a conveyor surface, the method including:
    (a) while a first roller is being driven in a first direction of rotation about a first roller axis to drive a friction element along a portion of the circumference of the first roller, lowering the friction element onto a selected product to be sorted out of the product stream as a portion of the selected product is located on the conveyor surface below the friction element so that the friction element acts on an upper side of the selected product facing away from the conveyor surface along a contact zone of the friction element with a contact force in order to apply a frictional force to the selected product to move the selected product laterally out of the conveying path in a first sorting direction; and
    (b) after applying the frictional force to the selected product, raising the friction element away from the conveyor surface sufficiently to allow a next product in the product stream to pass under the friction element wherein the friction element is raised away from the conveyor surface along a lifting direction while a portion of the selected product is still located below the friction element with respect to the lifting direction.

9. The method of claim 8 wherein the coefficient of friction between the conveyor surface and the material of the product supported on the conveyor surface is selected to be smaller than the coefficient of friction between the selected product and the portion of the friction element in the contact zone.

10. The method of claim 8 wherein the friction element is driven at a constant speed between 0.1 m/s and 100 m/s.

11. The method of claim 8 wherein the contact time between the friction element and the selected product is less than 100 ms.

12. The method of claim 8 wherein the selected product acted upon by the friction element is moved out of the conveying path orthogonally to the first roller axis.

13. The method of claim 8 wherein the first sorting direction lies at a sorting angle (α) to the conveying direction where (α) is either greater than or less than 90°.

14. The method of claim 8 wherein the first sorting direction lies at a sorting angle of 90° to the conveying direction.

15. The method of claim 8 wherein the product stream is conveyed at a rate of at least 500 discrete products per minute.

16. The method of claim 8 wherein the friction element comprises a belt having a straight section and wherein a portion of the contact zone extends along the straight section of the belt.

17. The method of claim 16 wherein the contact zone extends partially along the straight section of the belt and partially along an arc-shaped section of the belt guided around the first roller.

18. The method of claim 8 wherein the friction element extends around the entire circumference of the first roller and the contact zone extends along an arc-shaped section of the friction element.

19. A sorting device comprising:
(a) a conveyor for conveying discrete products in a product stream along a conveying path in a conveying direction with the discrete products being supported on a conveyor surface;
(b) a first roller defining a first roller circumference and being configured to be driven in a first direction of rotation about a first roller axis;
(c) a friction element extending along a portion of the first roller circumference in position to be driven about the first roller as the first roller is driven about the first roller axis, the friction element being moveable in a lifting direction extending transverse to the conveyor surface between a lowered position and a raised position;
(d) a lifting mechanism connected to the first roller and operable to move the first roller in the lifting direction between an upper end position and a lower end position and wherein the lowered position of the friction element corresponds to a position of the first roller at the lower end position or between the lower end position and the upper end position, wherein the distance between the upper end position and the lower end position is less than 20 mm; and
(e) wherein the friction element in the lowered position is located relative to the conveyor surface to contact a selected product of the discrete products with a contact pressure force along a contact zone to thereby exert a first direction frictional force on the selected product as the first roller is driven in the first direction of rotation, the first direction frictional force being sufficient to accelerate the selected product in a first sorting direction deviating from the conveying direction to sort the selected product out of the product stream.

20. A method of sorting discrete products from a product stream being conveyed along a conveying path in a conveying direction while being supported on a conveyor surface, the method including:
(a) while a first roller is being driven in a first direction of rotation about a first roller axis to drive a friction element along a portion of the circumference of the first roller, lowering the friction element onto a selected product to be sorted out of the product stream as a portion of the selected product is located on the conveyor surface below the friction element so that the friction element acts on an upper side of the selected product facing away from the conveyor surface along a contact zone of the friction element with a contact force in order to apply a frictional force to the selected product to move the selected product laterally out of the conveying path in a first sorting direction, wherein a contact time between the friction element and the selected product is less than 100 ms; and
(b) after applying the frictional force to the selected product, raising the friction element away from the conveyor surface sufficiently to allow a next product in the product stream to pass under the friction element.

21. A method of sorting discrete products from a product stream being conveyed along a conveying path in a conveying direction while being supported on a conveyor surface, the method including:
(a) conveying the product stream along the conveying path at a rate of at least 500 discrete products per minute;
(b) while a first roller is being driven in a first direction of rotation about a first roller axis to drive a friction element along a portion of the circumference of the first roller, lowering the friction element onto a selected product to be sorted out of the product stream as a portion of the selected product is located on the conveyor surface below the friction element so that the friction element acts on an upper side of the selected product facing away from the conveyor surface along a contact zone of the friction element with a contact force in order to apply a frictional force to the selected product to move the selected product laterally out of the conveying path in a first sorting direction; and
(c) after applying the frictional force to the selected product, raising the friction element away from the conveyor surface sufficiently to allow a next product in the product stream to pass under the friction element.

* * * * *